United States Patent
Musk

(10) Patent No.: US 9,488,785 B2
(45) Date of Patent: Nov. 8, 2016

(54) OPTICAL SUBASSEMBLY, OPTICAL SYSTEM AND METHOD

(71) Applicant: EFFECT PHOTONICS B.V., Eindhoven (NL)

(72) Inventor: Robert William Musk, Kingsbridge (GB)

(73) Assignee: EFFECT PHOTONICS B.V., Eindhoven (NL)

( * ) Notice: Subject to any disclaimer, the term of this patent is extended or adjusted under 35 U.S.C. 154(b) by 0 days.

(21) Appl. No.: 14/907,074

(22) PCT Filed: Jul. 24, 2014

(86) PCT No.: PCT/NL2014/050510
§ 371 (c)(1),
(2) Date: Jan. 22, 2016

(87) PCT Pub. No.: WO2015/012694
PCT Pub. Date: Jan. 29, 2015

(65) Prior Publication Data
US 2016/0154179 A1 Jun. 2, 2016

(30) Foreign Application Priority Data
Jul. 24, 2013 (EP) .................................... 13177770

(51) Int. Cl.
*G02B 6/30* (2006.01)
*G02B 6/36* (2006.01)
*G02B 6/42* (2006.01)
(Continued)

(52) U.S. Cl.
CPC ............. *G02B 6/30* (2013.01); *G02B 6/12002* (2013.01); *G02B 6/13* (2013.01); *G02B 6/3652* (2013.01); *G02B 6/423* (2013.01); *G02B 6/4239* (2013.01)

(58) Field of Classification Search
None
See application file for complete search history.

(56) References Cited

U.S. PATENT DOCUMENTS

| | | | | |
|---|---|---|---|---|
| 4,237,474 A | * | 12/1980 | Ladany ................ | G02B 6/4202 257/712 |
| 4,767,174 A | * | 8/1988 | Carenco ................... | G02B 6/30 156/158 |
| 6,112,001 A | * | 8/2000 | Kishida .................... | G02B 6/30 385/147 |

(Continued)

FOREIGN PATENT DOCUMENTS

EP    1 442 326 B1    5/2007

OTHER PUBLICATIONS

International Search Report, dated Sep. 19, 2014, from corresponding PCT application.

*Primary Examiner* — Mike Stahl
(74) *Attorney, Agent, or Firm* — Young & Thompson

(57) ABSTRACT

Disclosed is an optical subassembly (1) including a carrier substrate (2), a photonic integrated circuit (3) (PIC) including a first optical waveguide (4) having a first longitudinal central axis, the PIC being arranged on the carrier substrate, an external optical system (5) including a second optical waveguide (6) having a second longitudinal central axis, a component (7) for supporting the external optical system on the carrier substrate and maintaining alignment of the first and second longitudinal central axes with respect to each other, and an adhesive material (8, 9) being arranged between the component and the carrier substrate and between the component and the external optical system, the adhesive material having a total thickness of less than 10 μm. Also disclosed is an optical system (12) including such optical subassembly and a method of fabricating such optical subassembly.

20 Claims, 4 Drawing Sheets

(51) Int. Cl.
*G02B 6/12* (2006.01)
*G02B 6/13* (2006.01)

(56) References Cited

U.S. PATENT DOCUMENTS

| | | | |
|---|---|---|---|
| 6,435,733 B1* | 8/2002 | Parat | G02B 6/30 385/137 |
| 6,758,610 B2* | 7/2004 | Ziari | G02B 6/4201 385/88 |
| 2001/0024552 A1* | 9/2001 | Kitaoka | G02B 6/42 385/91 |
| 2001/0036352 A1* | 11/2001 | Kadar-Kallen | G02B 6/2937 385/136 |
| 2002/0196998 A1 | 12/2002 | Steinberg et al. | |
| 2004/0057129 A1* | 3/2004 | Tekippe | G02B 6/32 359/819 |
| 2005/0074039 A1* | 4/2005 | Kuramachi | G02B 6/4206 372/22 |
| 2007/0025663 A1* | 2/2007 | Kuroda | G02B 6/30 385/49 |
| 2007/0201797 A1* | 8/2007 | Grzybowski | B29D 11/00384 385/52 |
| 2009/0110354 A1 | 4/2009 | Sutherland | |

* cited by examiner

OPTICAL SUBASSEMBLY, OPTICAL SYSTEM AND METHOD

FIELD OF THE INVENTION

The invention relates to an optical subassembly comprising a carrier substrate, a photonic integrated circuit (PIC) comprising a first optical waveguide having a first longitudinal central axis, the PIC being arranged on the carrier substrate, an external optical system comprising a second optical waveguide having a second longitudinal central axis, a component for supporting the external optical system on the carrier substrate and maintaining alignment of the first longitudinal central axis of the first optical waveguide and the second longitudinal central axis of the second optical waveguide with respect to each other. The optical subassembly according to the invention provides significantly reduced misalignment between the first longitudinal central axis and the second longitudinal central axis during production, curing, aging and lifetime of the optical subassembly according to the invention. The invention also relates to an optical system comprising an optical subassembly according to the invention and a method of fabricating an optical subassembly according to the invention.

BACKGROUND OF THE INVENTION

As the complexity of photonic integrated circuits (PICs) increases, the physical size and the number of electrical connections, among others, also increase significantly. Unlike electrical integrated circuits, PICs comprising at least one optical waveguide require one or more optical interfaces in order to get photons in or out of the PIC, i.e. to enable optical communication between said at least one optical waveguide and an external optical system such as an optical fiber.

Regarding packaging of an optical subassembly that comprises a PIC and an external optical system, the optical interfaces between the PIC and the external optical system present several constraints.

A first exemplary constraint is the use of a lens or an optical coupling system to maximise the coupling efficiency between the PIC and the external optical system.

A second exemplary constraint is that it is absolutely essential to fixate the external optical system, e.g. an optical fiber, at the point of highest coupling efficiency from the PIC to the external optical system, i.e. to align and maintain alignment of the first longitudinal central axis of the first optical waveguide of the PIC and the second longitudinal central axis of the second optical waveguide of the external optical system.

A third exemplary constraint is that a method of aligning the external optical system to the PIC and fixating the external optical system to the carrier substrate must be automatable for use in high-volume low-cost applications. Furthermore, the method must use low-cost materials which are commonly available.

Several processes are in common use to fixate an optical fiber in place to within 500 nm precision to provide a stable optical interface between the PIC of an optical subassembly and the optical fiber output. These processes include the application of unfilled resins or resins filled with particulate matter to reduce shrinking of the resin upon curing. Both the unfilled and the filled resins are curable by at least one of ultraviolet (UV) light and heat. A further process includes fixation of optical fibers using metal clips or preforms, either welded or induction heated.

Currently, all of the processes mentioned above have main disadvantages. Unfilled resins or epoxies have an inherent problem with shrinkage during curing, often 2% to 5% shrinkage of linear dimensions. A glue line between the optical fiber and the carrier substrate of the optical subassembly may be 100-150 µm thick. In this case, a linear shrinkage of 2% to 5% percent may yield an alignment drift of 2 µm to 7.5 µm during curing. It is known that as a result of the latter significant alignment drift, coupling efficiency between the first optical waveguide of the PIC and the second optical waveguide of the optical fiber will drop at least by 5 dB. This may be countered by intentionally mis-aligning the fiber to account for the shrinkage induced alignment drift, but such a process is not repeatable enough for use in production environments.

Filled resins or epoxies comprise uncompressible particles, e.g. acrylate spheres having a diameter in a range of about 1 µm to 5 µm. Upon curing a filled resin, the liquid resin part exhibits the same linear shrinkage of 2% to 5% as in the case of unfilled resins. This shrinkage, in turn, causes the solid particulate spheres to pack tightly together. The compound shrinkage effect of a filled resin is then minimized to well below 0.5%. However, the filling particles clog automated dispensing nozzles and therefore this process is not suited for being automated in a production environment. Regarding the application of filled resins, the cost of labour is prohibitive.

Optical fiber fixation using metal harnesses is a scalable and automatable process. However, the biggest drawback is the need for per-design micromachined metal harnesses to fit both the optical fiber and the geometry of the packaging for the optical subassembly. The requirements of per-piece parts and a specialized laser welding setup add a large cost to the overall packaging total. The bill-of-materials for this packaging method alone can be two orders of magnitude higher than the resin- or epoxy-based methods mentioned above.

SUMMARY OF THE INVENTION

It is an object of the invention to provide an optical subassembly attaining a significantly reduced misalignment between the first longitudinal central axis of the first optical waveguide of the PIC and the second longitudinal central axis of the external optical system, e.g. an optical fiber, during production, curing, aging and lifetime of the optical subassembly according to the invention. In addition, the optical subassembly according to the invention pre-empts or at least reduces at least one of the other disadvantages mentioned above. It is also an object of the invention to provide an optical system comprising an optical subassembly according to this invention. Furthermore, it is an object of the invention to provide a method of fabricating an optical subassembly according to this invention that is repeatable enough and can be automated for use in a production environment.

Aspects of this invention are set out in the accompanying independent and dependent claims. Combinations of features from the dependent claims may be combined with features of the independent claims as appropriate and not merely as explicitly set out in the claims.

According to a first aspect of this invention, there is provided an optical subassembly comprising a carrier substrate, a photonic integrated circuit (PIC) comprising a first optical waveguide having a first longitudinal central axis, the PIC being arranged on the carrier substrate, an external optical system comprising a second optical waveguide having a second longitudinal central axis, a component for supporting the external optical system on the carrier substrate and maintaining alignment of the first longitudinal central axis of the first optical waveguide and the second longitudinal central axis of the second optical waveguide with respect to each other, a first layer of adhesive material being arranged between the component and the carrier substrate, and a second layer of adhesive material being arranged between the component and the external optical system, the first and second layers of adhesive material having respective first and second thicknesses, the sum of the first and second thicknesses being less than 10 μm.

In an embodiment of the optical subassembly according to the invention, the component comprises a material that is transparent for radiation for curing the first and second layers of adhesive material.

In an embodiment of the optical subassembly according to the invention, the material of the component is transparent for at least one of blue and ultraviolet (UV) radiation.

In an embodiment of the optical subassembly according to the invention, the material of the component is a glass-based material.

In an embodiment of the optical subassembly according to the invention, the glass-based material is borosilicate glass.

In an embodiment of the optical subassembly according to the invention, the component is provided with a cavity for receiving the external optical system and the second layer of adhesive material.

In an embodiment of the optical subassembly according to the invention, the cavity is one of a slot and a bore.

In an embodiment of the optical subassembly according to the invention, the external optical system is an optical fiber.

In an embodiment of the optical subassembly according to the invention, the second layer of adhesive material is arranged at the perimeter of the optical fiber as a plurality of symmetric elongated strips that are equally spaced with respect to each other in a circumferential direction of the optical fiber.

In an embodiment of the optical subassembly according to the invention, the adhesive material is an unfilled resin.

According to a second aspect of this invention, there is provided an optical system comprising an optical subassembly according to this invention.

According to a third aspect of this invention, there is provided a method of fabricating an optical subassembly comprising the steps of providing a carrier substrate, providing a photonic integrated circuit (PIC) comprising a first optical waveguide having a first longitudinal central axis, arranging the PIC on the carrier substrate, providing an external optical system comprising a second optical waveguide having a second longitudinal central axis, aligning the first longitudinal central axis of the first optical waveguide and the second longitudinal central axis of the second optical waveguide with respect to each other, providing a component for supporting the external optical system on the carrier substrate and maintaining the alignment of the first longitudinal central axis and the second longitudinal central axis, applying a first layer of adhesive material between the component and the carrier substrate and a second layer of adhesive material between the component and the external optical system, the first and second layers of adhesive material having respective first and second thicknesses, the sum of the first and second thicknesses being less than 10 μm, and curing the first and second layers of adhesive material.

In an embodiment of the method according to the invention, the method comprises a step of re-aligning the first longitudinal central axis of the first optical waveguide and the second longitudinal central axis of the second optical waveguide with respect to each other before curing the first and second layers of adhesive material.

In an embodiment of the method according to the invention, the component is provided with a cavity for receiving the external optical system and the second layer of the adhesive material.

In an embodiment of the method according to the invention, the cavity is arranged for wicking at least one of the first and second layers of adhesive material.

In an embodiment of the method according to the invention, the component comprises a material that is transparent for radiation for curing the first and second layers of adhesive material.

In an embodiment of the method according to the invention, at least one of blue or ultraviolet (UV) radiation is used for curing the first and second layers of adhesive material.

In an embodiment of the method according to the invention, the adhesive material is an unfilled resin.

BRIEF DESCRIPTION OF THE DRAWINGS

Embodiments of the present invention will be described hereinafter, by way of example only, with reference to the accompanying drawings which are schematic in nature and therefore not necessarily drawn to scale. Furthermore, like reference signs in the drawings relate to like elements. On the attached drawing sheets.

FIG. 1b provides a closer view of the schematic cross-section of the exemplary embodiment shown in FIG. 1a;

DETAILED DESCRIPTION

Embodiments of the present invention are described in the following with reference to the accompanying drawings.

Figure 1A:
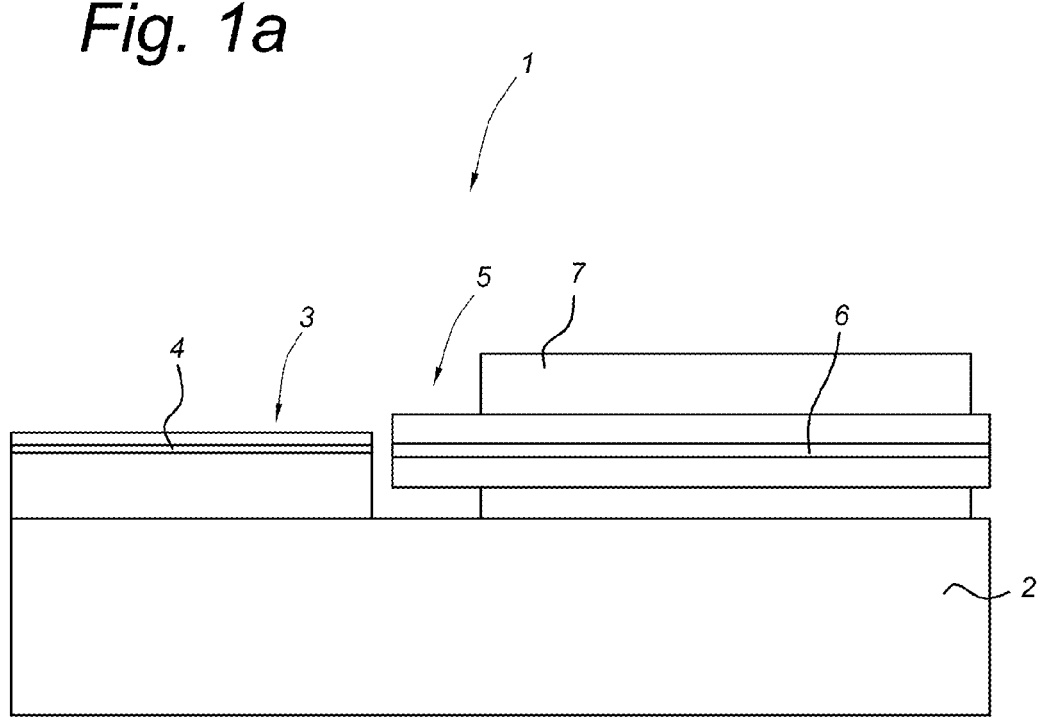
FIG. 1a shows a schematic cross-section of an exemplary embodiment of an optical subassembly according to the invention.

FIG. 1a shows a schematic cross-section of an exemplary embodiment of an optical subassembly 1 according to the invention for achieving at least one of the objects mentioned above. The optical subassembly 1 comprises a carrier substrate 2, a photonic integrated circuit (PIC) 3 comprising a first optical waveguide 4 having a first longitudinal central axis, the PIC 3 being arranged on the carrier substrate 2, an external optical system 5, in this case an optical fiber, comprising a second optical waveguide 6 having a second longitudinal central axis, a component 7 for supporting the optical fiber 5 on the carrier substrate 2 and maintaining alignment of the first longitudinal central axis of the first optical waveguide 4 and the second longitudinal central axis of the second optical waveguide 6 with respect to each other.

Figure 1B:
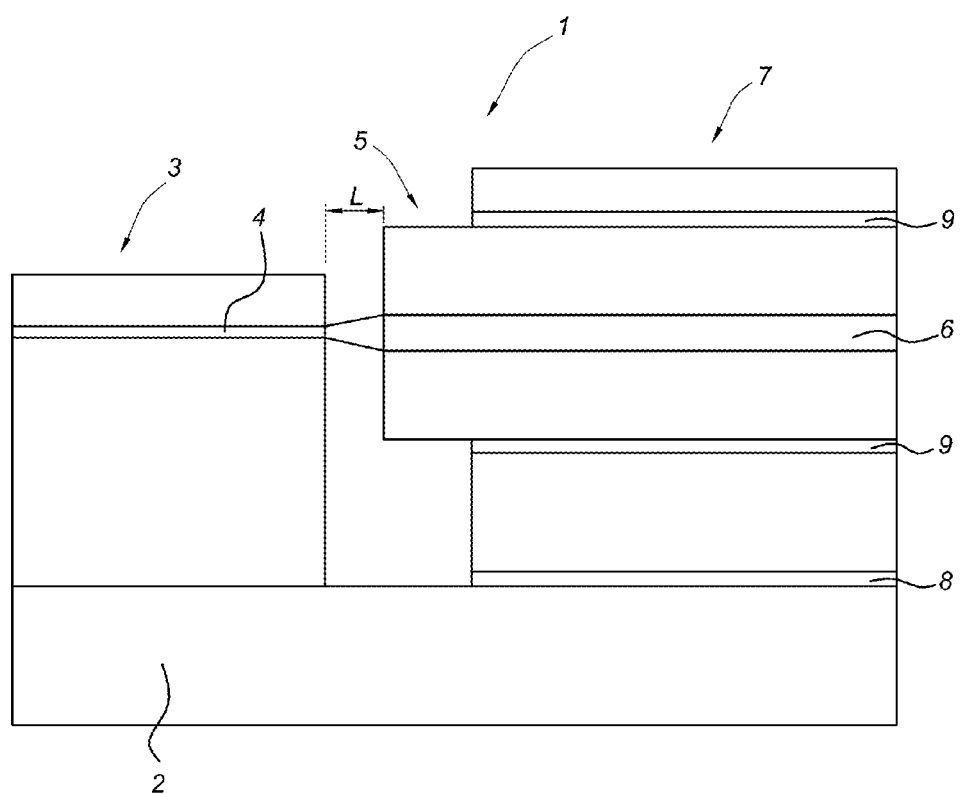

FIG. 1b provides a closer view of the schematic cross-section of the exemplary embodiment shown in FIG. 1a, showing that the optical subassembly 1 further comprises a first layer 8 of adhesive material that is arranged between the component 7 and the carrier substrate 2 for mounting the component 7 on the carrier substrate 2. Furthermore, it can be seen that a second layer 9 of adhesive material is arranged between the component 7 and the optical fiber 5 for fixing the optical fiber 5 to the component 7. This is done to fix a lateral distance L between the PIC 3 and the optical fiber 5.

The first 8 and second 9 layers of adhesive material have respective first and second thicknesses, the sum of the first and second thicknesses is less than 10 µm. In this way it can be achieved that the amount of misalignment of the first longitudinal central axis of the first optical waveguide 4 of the PIC 3 and the second longitudinal central axis of the second optical waveguide 6 of the optical fiber 5 as a result of production, curing, aging and lifetime of the optical subassembly 1 according to the invention is less than 500 nm even if an unfilled resin typically having 2% to 5% shrinkage of linear dimensions is used as adhesive material.

Figure 2A:
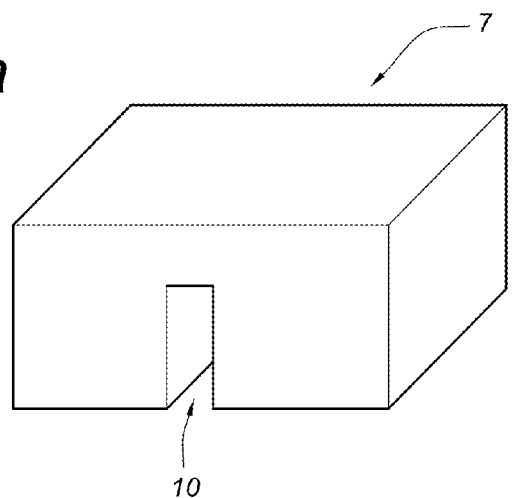
FIG. 2a shows a schematic perspective view of an exemplary embodiment of a component for supporting the optical fiber on the carrier substrate.

FIG. 2a shows a schematic perspective view of an exemplary embodiment of a component 7 for supporting the optical fiber 5 on the carrier substrate 2, wherein the component 7 is provided with a cavity that in this case is a slot 10 for receiving the optical fiber 5 and the second layer 9 of the adhesive material. In another embodiment the cavity 10 can be a bore.

According to the invention, the component 7 comprises a material that is transparent for radiation in order to cure the first 8 and second 9 layers of the adhesive material. In particular, the material of the component 7 is transparent for at least one of blue and ultraviolet (UV) radiation. In this respect, glass-based materials such as borosilicate glass are very suitable for curing liquid unfilled resins or epoxies that preferably are being used as adhesive material for reasons mentioned above.

Furthermore, a glass-based block that can be used to fabricate a glass-based pre-form bridge 7 as a component 7 according to the invention, has geometries that are selected such that the slot 10 of the glass-based pre-form bridge 7 and any separation cuts can be applied using a standard size diamond blade saw. This allows the glass-based pre-form bridge 7 to be fabricated in a waferscale process, dropping the price per glass-based pre-form bridge 7 into the cents range. In this way a low-cost solution can be provided to implement the component 7 according to the invention.

Figure 2B:
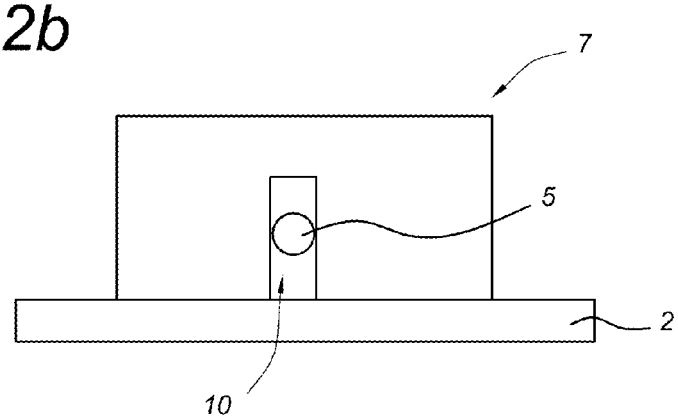
FIG. 2b shows a schematic cross-section of the exemplary embodiment of the component shown in FIG. 2a, wherein the optical fiber is arranged in a cavity.

FIG. 2b shows a schematic cross-section of the exemplary embodiment of the component shown in FIG. 2a, wherein the optical fiber 5 is arranged in the slot 10 of the glass-based pre-form bridge 7. The skilled person will appreciate that the slot 10 has a width that is slightly wider than the outer diameter of the optical fiber 5 in order to enable capillary action by which unfilled resin will be wicked where required for fixing the optical fiber to the glass-based pre-form bridge 7.

Figure 2C:
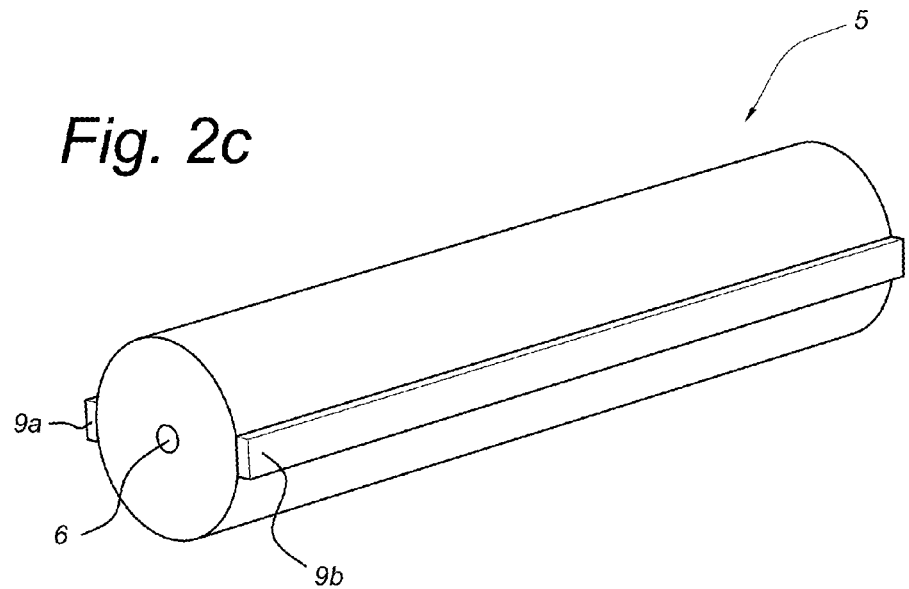
FIG. 2c provides a schematic perspective view of an exemplary embodiment of an optical fiber that is provided with symmetric strips of the second layer of adhesive material being arranged at the perimeter of the optical fiber.

FIG. 2c provides a schematic perspective view of an exemplary embodiment of the optical fiber 5 wherein the optical fiber 5 is provided with two symmetric elongated strips 9a, 9b of the second layer 9 of adhesive material at its perimeter. The strips 9a, 9b are equally spaced with respect to each other in a circumferential direction of the optical fiber 5. The strips 9a, 9b can be the result of wicking of the unfilled resin at the positions shown in FIG. 2b where the distance between the outer diameter of the optical fiber 5 and the inner walls of the slot 10 are narrowest. The arrangement of the symmetric elongated strips 9a, 9b of the second layer 9 of adhesive material shown in FIG. 2c allows shrinking effects to cancel each other out. As a result, alignment accuracy can further be increased. The skilled person will appreciate that according to another exemplary embodiment of the invention the number of elongated strips can be three, four or five, i.e. any suitable and practical number. The skilled person will also appreciate that the configuration of the slot 10 and the positioning of the optical fiber 5 in the slot 10 will determine the actual configuration of the elongated strips of the second layer 9 of adhesive material. Furthermore, the skilled person will appreciate that the elongated strips may be applied on the optical fiber 5 by any suitable technique.

In addition, the skilled person will appreciate that the coplanarity and surface area of the bottom of the glass-based pre-form bridge 7 and the top of the carrier substrate 2 allow for a very thin and extremely strong adhesion, obviating the need for specialized high-strength low-precision strain relief mechanics.

Moreover, using surface tension and wetting allows low-viscosity unfilled resins or epoxies to effectively coat the outside and inside surfaces of the glass-based pre-form bridge 7 with the optimum amount of adhesive thickness, i.e. the total thickness of the first 8 and second 9 layers of the adhesive material are less than 10 µm.

In an alternative embodiment, the glass-based pre-form bridge 7 could be positioned trough up, i.e. the glass-based pre-form bridge 7 is positioned on the carrier substrate 2 such that the slot 10 faces away from the top of the carrier substrate 2. However, this arrangement would require a this base of the glass-based pre-form bridge 7 in order to align the first longitudinal central axis of the first optical waveguide 4 of the PIC 3 and the second longitudinal central axis of the second optical waveguide 6 of the optical fiber 5.

According to the invention, the first longitudinal central axis of the first optical waveguide 4 and the second longitudinal central axis of the second optical waveguide 6 are first so-called dry aligned, i.e. the second optical waveguide 6 is positioned with respect to the first optical waveguide 4 at the point of highest coupling efficiency from the PIC 3 to the optical fiber 5 without finally fixing the optical fiber 5 to the carrier substrate 2. Then, the glass-based pre-form bridge 7 is positioned on the carrier substrate 2 thereby receiving the optical fiber 5 in the slot 10. Next, liquid unfilled resin is applied to a side of the glass-based pre-form bridge 7 facing away from the PIC 3. As a result of the capillary action, surface tension and wetting described above, a first 8 and second 9 layer of the unfilled resin is formed to eventually fix the glass-based pre-form bridge 7 to the carrier substrate 2 and the optical fiber 5 respectively. If realignment of the first longitudinal central axis of the first optical waveguide 4 and the second longitudinal central axis of the second optical waveguide 6 is required this may be done. Finally, the first 8 and second 9 layers of the liquid unfilled resin are cured using blue or UV light. Upon curing the unfilled resin is deprived of solvent and the unfilled resin hardens to fix the glass-based pre-form bridge 7 to the carrier substrate 2 and the optical fiber 5 respectively. The total thickness of the first 8 and second 9 layers of the unfilled resin is less than 10 µm. As a result, the optical subassembly 1 according to the invention allows the above described curing-induced shrinkage of the unfilled resin and the associated movement of the optical fiber 5 to be less than 500 nm.

Figure 3:
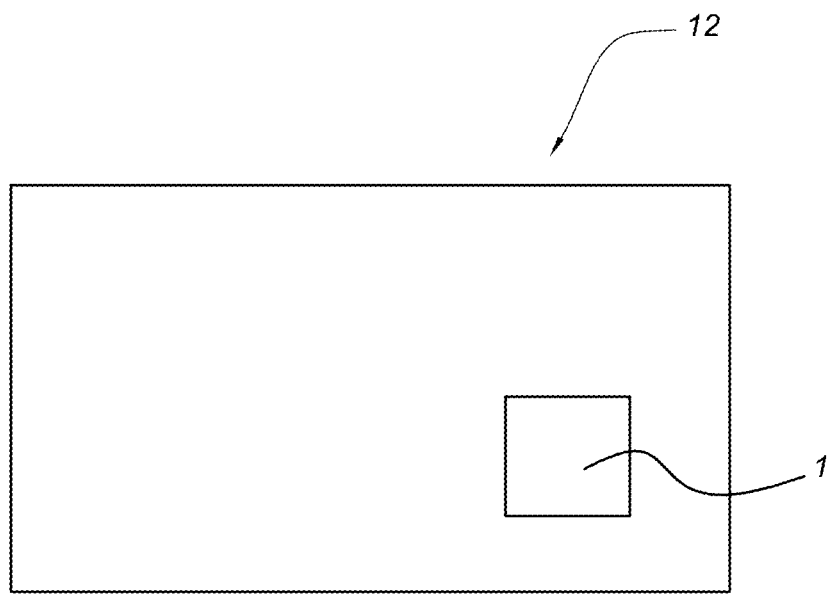
FIG. 3 shows a schematic layout of an exemplary embodiment of an optical system according to the invention comprising an optical subassembly according to the invention.

FIG. 3 shows a schematic layout of an exemplary embodiment of an optical system 12 comprising an optical subassembly 1 according to the invention. The skilled person will appreciate that many optical systems 12 according to the invention ranging from low-complexity to high-complexity systems may be envisaged. Furthermore, the skilled person will appreciate that optical systems 12 according to the invention may be used in various applications including telecommunications applications.

Accordingly, it has been described that this invention relates to an optical subassembly 1 comprising a carrier substrate 2, a photonic integrated circuit 3 (PIC) comprising a first optical waveguide 4 having a first longitudinal central axis, the PIC being arranged on the carrier substrate, an external optical system 5 comprising a second optical waveguide 6 having a second longitudinal central axis, a component 7 for supporting the external optical system on the carrier substrate and maintaining alignment of the first and second longitudinal central axes with respect to each other, and an adhesive material 8, 9 being arranged between the component and the carrier substrate and between the component and the external optical system, the adhesive material having a total thickness of less than 10 µm. The invention also relates to an optical system 12 comprising an optical subassembly 1 according to the invention and to a method of fabricating an optical subassembly 1 according to the invention.

In particular, the invention provides a solution that is particularly suited to low-cost volume packaging efforts of optical subassemblies 1 by using an unfilled resin or epoxy which can be applied using automated methods and prevent it from shrinking using a glass-based pre-form bridge 7. By using this pre-form in effect as a method to minimize the linear thickness of the unfilled resin or epoxy layer. By reducing the total thickness of the first 8 and second 9 layers of the unfilled resin to less than 10 um, even a linear shrinkage of 5% will allow to keep the curing-induced shrinkage of the unfilled resin and the associated movement of the optical fiber 5 below 500 nm. In this way fiber alignment tolerances can be met by using low-cost materials. Furthermore, by using unfilled resins or epoxies it may be possible to establish an automated production method for high-volume and low-cost applications. Moreover, it may be possible to provide a piece-parts bill-of-materials that is several orders of magnitude lower than in the case of using metal harnesses.

In the foregoing description of the drawings, the invention has been described with reference to specific embodiments thereof. It will, however, be evident that various modifications/additions and/or changes/substitutions may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. An optical subassembly (1) comprising
a carrier substrate (2);
a photonic integrated circuit (3), PIC, comprising a first optical waveguide (4) having a first longitudinal central axis, said PIC (3) being arranged on the carrier substrate (2);
an external optical system (5) comprising a second optical waveguide (6) having a second longitudinal central axis;
a component (7) for supporting the external optical system (5) on the carrier substrate (2) and maintaining alignment of the first longitudinal central axis of the first optical waveguide (4) and the second longitudinal central axis of the second optical waveguide (6) with respect to each other;
a first layer (8) of adhesive material being arranged between said component (7) and the carrier substrate (2); and
a second layer (9) of adhesive material being arranged between said component (7) and the external optical system (5), said first (8) and second (9) layers of adhesive material having respective first and second thicknesses, the sum of said first and second thicknesses being less than 10 µm.

2. The optical subassembly (1) according to claim 1, wherein said component (7) comprises a material that is transparent for radiation for curing said first (8) and second (9) layers of adhesive material.

3. The optical subassembly (1) according to claim 1, wherein the material of said component (7) is transparent for at least one of blue and ultraviolet, UV, radiation.

4. The optical subassembly (1) according to claim 1, wherein the material of said component (7) is a glass-based material.

5. The optical subassembly (1) according to claim 4, wherein the glass-based material is borosilicate glass.

6. The optical subassembly (1) according to claim 1, wherein said component (7) is provided with a cavity (10) for receiving the external optical system (5) and the second layer (9) of adhesive material.

7. The optical subassembly (1) according to claim 6, said cavity (10) being one of a slot and a bore.

8. The optical subassembly (1) according to claim 1, wherein the external optical system (5) is an optical fiber.

9. The optical subassembly (1) according to claim 8, wherein the second layer (9) of adhesive material is arranged at the perimeter of the optical fiber (5) as a plurality of symmetric elongated strips (9a, 9b) that are equally spaced with respect to each other in a circumferential direction of the optical fiber (5).

10. The optical subassembly (1) according to claim 1, wherein the adhesive material is an unfilled resin.

11. An optical system (12) comprising an optical subassembly (1) according to claim 1.

12. A method of fabricating an optical subassembly (1) comprising
providing a carrier substrate (2);
providing a photonic integrated circuit (3), PIC, comprising a first optical waveguide (4) having a first longitudinal central axis;
arranging the PIC (3) on the carrier substrate (2);
providing an external optical system (5) comprising a second optical waveguide (6) having a second longitudinal central axis;

aligning the first longitudinal central axis of the first optical waveguide (4) and the second longitudinal central axis of the second optical waveguide (6) with respect to each other;

providing a component (7) for supporting the external optical system (5) on the carrier substrate (2) and maintaining the alignment of the first longitudinal central axis and the second longitudinal central axis;

applying a first layer (8) of adhesive material between said component (7) and the carrier substrate (2) and a second layer (9) of adhesive material between said component (7) and the external optical system (5), said first (8) and second (9) layers of adhesive material having respective first and second thicknesses, the sum of said first and second thicknesses being less than 10 µm; and curing said first (8) and second (9) layers of adhesive material.

13. The method according to claim 12, comprising re-aligning the first longitudinal central axis of the first optical waveguide (4) and the second longitudinal central axis of the second optical waveguide (6) with respect to each other before curing the first (8) and second (9) layers of adhesive material.

14. The method according to claim 12, wherein said component (7) is provided with a cavity (10) for receiving the external optical system (5) and the second layer (9) of the adhesive material.

15. The method according to claim 14, said cavity (10) being arranged for wicking at least one of said first (8) and second (9) layers of adhesive material.

16. The method according to claim 12, wherein said component (7) comprises a material that is transparent for radiation for curing the first (8) and second (9) layers of adhesive material.

17. The method according to claim 12, wherein at least one of blue or ultraviolet, UV, radiation is used for curing the first (8) and second (9) layers of adhesive material.

18. The method according to claim 12, wherein the adhesive material is an unfilled resin.

19. The optical subassembly (1) according to claim 2, wherein the material of said component (7) is transparent for at least one of blue and ultraviolet, UV, radiation.

20. The optical subassembly (1) according to claim 2, wherein the material of said component (7) is a glass-based material.

* * * * *